United States Patent [19]

Underwood

[11] Patent Number: 4,535,787
[45] Date of Patent: Aug. 20, 1985

[54] AXIAL FLOW COMBINE

[75] Inventor: Mark R. Underwood, Burr Oak, Kans.

[73] Assignee: Probe Adventures, Inc., Burr Oak, Kans.

[21] Appl. No.: 622,887

[22] Filed: Jun. 21, 1984

Related U.S. Application Data

[62] Division of Ser. No. 409,294, Aug. 18, 1982, Pat. No. 4,487,733.

[51] Int. Cl.$^3$ .............................................. A01F 12/18
[52] U.S. Cl. .................. 130/27 T; 130/27 R
[58] Field of Search ............. 56/14.6, 10.2, 209, 56/210, 215; 130/27 R, 27 B, 27 H, 27 J, 27 L, 27 P, 27 Q, 27 S, 27 T

[56] References Cited

U.S. PATENT DOCUMENTS

| | | | |
|---|---|---|---|
| 2,654,207 | 10/1953 | Long | 56/209 |
| 4,178,942 | 12/1979 | Nusser | 130/27 T |
| 4,198,802 | 4/1980 | Hengen et al. | 56/14.6 |
| 4,249,542 | 2/1981 | Schuler | 130/27 T |
| 4,257,216 | 3/1981 | Eiker et al. | 56/14.6 |
| 4,274,426 | 6/1981 | Williams | 130/27 T |
| 4,467,818 | 8/1984 | Donaldson et al. | 130/27 T |

FOREIGN PATENT DOCUMENTS

| | | | |
|---|---|---|---|
| 2808913 | 9/1978 | Fed. Rep. of Germany | 130/27 R |
| 921133 | 10/1945 | France | 130/27 T |

Primary Examiner—Gene Mancene
Assistant Examiner—John G. Weiss
Attorney, Agent, or Firm—James E. Bradley

[57] ABSTRACT

A combine for harvesting and threshing grain has features to prevent grain and time wastage even if the combine is tilted sideways, and other features to simplify the threshing equipment. The combine has a sieve housing that is mounted on rollers to the frame. These rollers allow the sieve housing to swing like a pendulum if the combine tilts sideways. The combine has inner and outer cylindrical bodies that rotate together opposite to the rotation of a threshing drum. The threshing drum and grate are conical with the rearward end being smaller than the forward end. A beater for beating grain rotates with the threshing drum, causing grain to fall through slots located in the inner body. The space between the inner and outer body contains a helical flight for transporting this rescued grain back to the forward end and to the sieves. Elevating rings mounted to the outer body rotate with the outer body to lift material from the sieve to the bin, if clean grain, and back to the threshing grate, if tailings.

5 Claims, 7 Drawing Figures ial Flow Combine

AXIAL FLOW COMBINE

This application is a division of application Ser. No. 409,294, filed 8/18/82 now U.S. Pat. No. 4,487,733, issued 12/25/84.

BACKGROUND OF THE INVENTION

This invention relates in general to agricultural equipment and in particular to a combine for harvesting and threshing grain using an axial flow threshing and separating means.

Self-propelled combines for harvesting and threshing grain such as wheat have been available for many years. These combines are large devices having a frame mounted on wheels. A header, often 14 to 30 feet wide, cuts the crop and forces it inwardly into a threshing means. The threshing means includes a cylinder with protruberances such as rasp bars that are rotated closely past a grate. The feed may be tangential or axial into the cylinder. Some of the cylinders are flared or conical. Grain threshed from the crop is conveyed into a sieve means which normally has primary and secondary sieves for removing chaff and returning tailings. The sieves are screens with inclined fingers, the screens being shaken to cause the clean grain to fall through. A blower blows air across the sieves to discharge the chaff. Tailings, which are too heavy to be blown out, but too large to fall through the fingers, are returned for further threshing to remove the grain from the debris of the crop.

After threshing, the crop debris, such as the straw, is pushed out by various means and discharged. The clean grain from the sieve is conveyed up to a storage bin on top of the combine, normally by paddles mounted on a chain. When the bin is full, the grain is conveyed into a track or trailer by means of an auger connected to the bin.

While successful, the large number of moving parts makes these combines expensive. The complexity also makes the combines subject to frequent failure. There are many bearings, V-belts, pulleys, chains and the like. Another problem occurs when the combine tilts transversely or sideways on a hill. This tends to load up one side of the sieves. Unless the operator slows the machine, grain is likely to be blown out and wasted. Slowing down the machine might avoid wastage of grain, but results in lower productivity for the combine. Combines with means for leveling portions of the combine to avoid this problem are available. However, the hydraulic systems used are complex and expensive.

SUMMARY OF THE INVENTION

A combine is provided with this invention that has many new features to reduce the complexity and accommodate for transverse tilting of the combine. To handle the tilting, the sieve housing is mounted on rollers which are carried in curved guide tracks. These rollers allow the sieve housing to swing with respect to the frame under the action of gravity and to remain level even when the combine becomes tilted.

The threshing and separating is handled by an axial flow assembly that extends longitudinally parallel with the longitudinal axis of the frame. This assembly includes a conical threshing drum with its large end at the intake. The conical threshing drum rotates within a conical threshing grate, which has bars that allow threshed grain to fall through into the sieve assembly. The threshing grate is connected to an outer body that rotates in the opposite direction to the rotation of the drum. An inner body is located inside the outer body, both of these bodies being cylindrical and concentric. The inner body is perforated for allowing grain to pass through into an area between the inner and outer bodies. A beater connected with the thresher drum beats the crop material after being threshed to further separate any grain and cause it to fall through the perforated inner body. The inner and outer bodies rotate together, and a helical flight is located between the bodies to cause the separated grain to move forwardly to the sieve. An inner helical flight located on the inner side of the inner body urges straw out the rearward end of the inner body.

A pair of elevating rings extend circumferentially around the outer body and rotate with the outer body. These elevating rings have individual compartments which will pick up material at a lower level and dump it at a higher level. The inner elevating ring picks up tailings discharged from the sieve and returns it to a tailing intake, which delivers the material back to the threshing drum. The outer elevating ring picks up clean grain and delivers it upwardly to a storage bin intake.

A rack and pinion assembly mounted to the rear of the thresher and beater assembly allows the clearance between the thresher drum and conical grate to be varied by rotating the pinion. All of the various rotating members are driven by engagements of the rotating members.

DESCRIPTION OF THE PREFERRED EMBODIMENT

Figure 1:
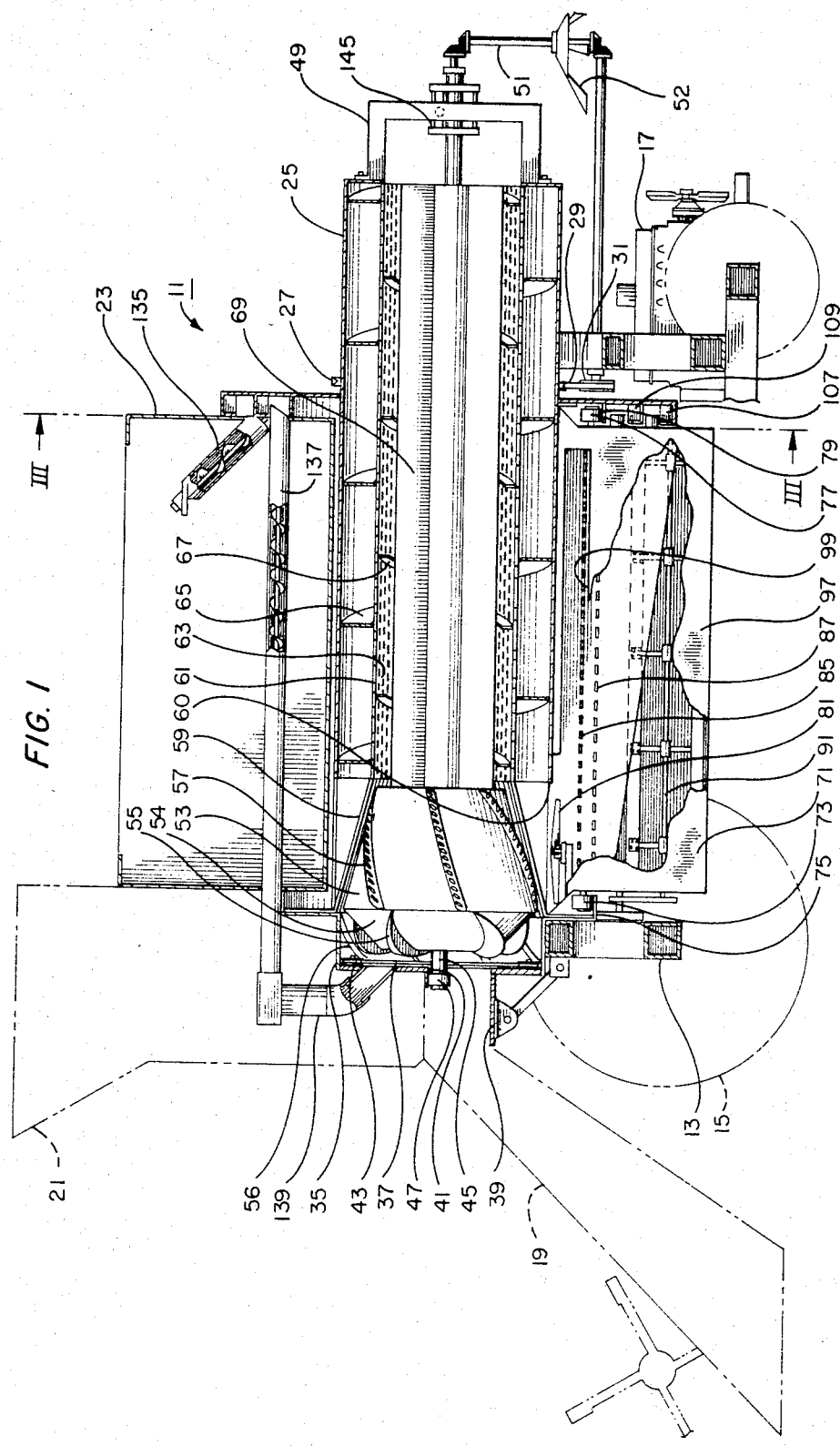
FIG. 1 is a vertical sectional view, partially simplified, of a combine constructed in accordance with this invention.

Referring to FIG. 1, combine 11 has a frame 13 comprised mainly of square tubular members. Wheels 15 are mounted to the frame, and an engine 17 drives the forward wheels as well as supplies power for the threshing functions. A conventional header assembly 19 is mounted to the forward end of frame 13. Header assembly 19 has a blade (not shown) that is reciprocated past knives (not shown) for cutting the crop. An auger (not shown) delivers the crop to the center, which is then conveyed upward on a chain belt (not shown). The operator controls the combine within a cab 21. Clean grain is stored in a bin 23 for subsequent unloading by an auger (not shown).

Figure 2:
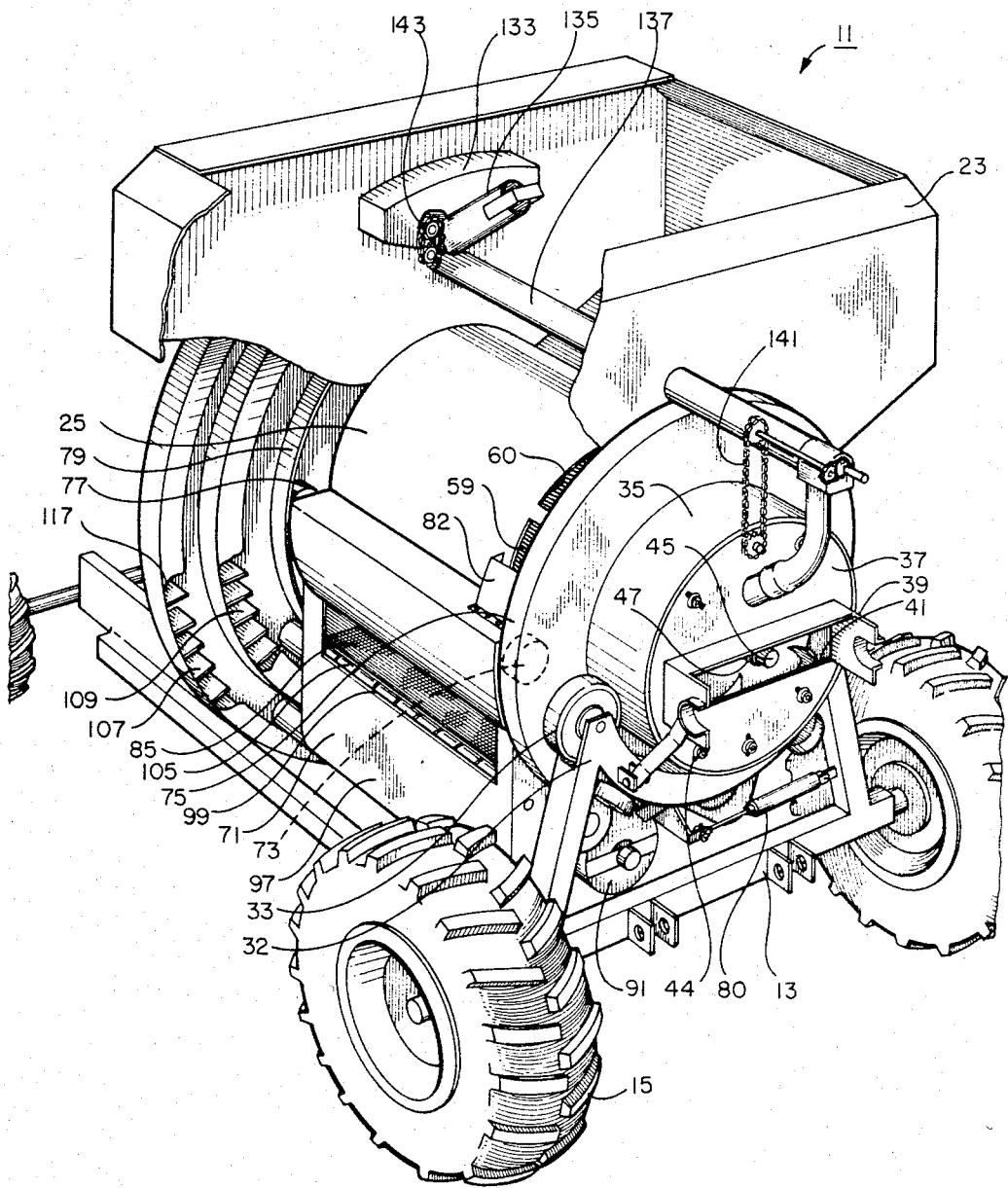
FIG. 2 is a partial perspective view of the combine of FIG. 1, with portions broken away.

Combine 11 includes an outer body 25 that is generally cylindrical, has a longitudinal axis that is parallel with the longitudinal axis of the frame, and extends much of the length of frame 13. Outer body 25 is rotated at a fairly low speed, about 20 revolutions per minute, by means of a pulley 27, which engages a V-belt 29. Belt 29 is driven by a drive pulley 31 connected to engine 17. As shown in FIG. 2, frame 13 has an upright cradle 32 that supports two rollers 33. The rollers 33 engage and support the outer body 25 to allow it to rotate. Similar rollers (not shown) are mounted on a cradle at the rearward end of frame 13.

Figure 6:
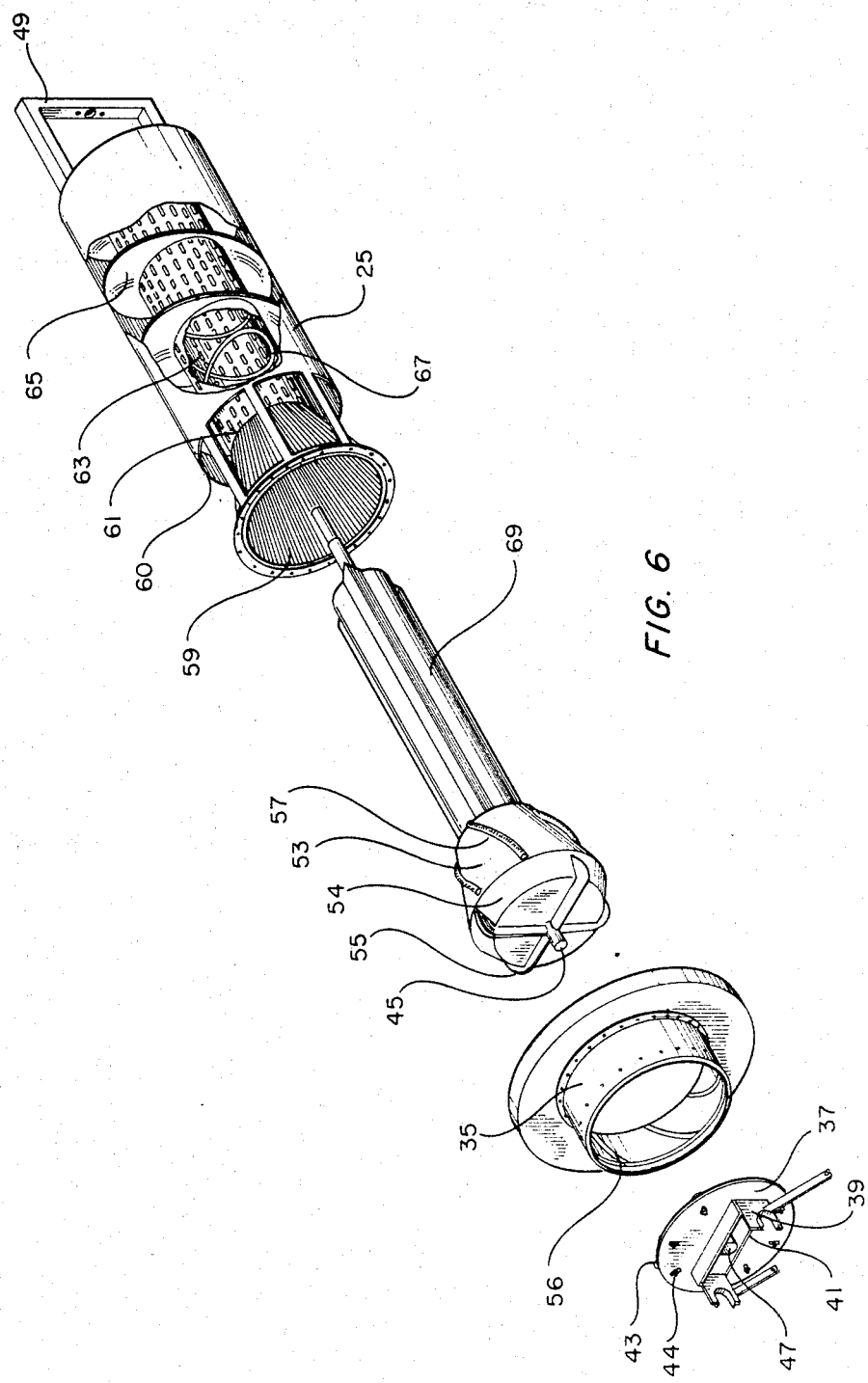
FIG. 6 is an exploded perspective view of the threshing and separating means of the combine of FIG. 1.

Referring still to FIG. 2, the portion of the outer body 25 that is engaged by rollers 43 is a cylindrical feeder housing 35. Feeder housing 35 is formed separately from outer body 25 and bolted as shown in FIG. 6. A circular, stationary plate 37 fits within the front opening of feeder housing 35. Plate 37 is rigidly mounted to frame 13 and has a bracket 39 for receiving the header 19 (FIG. 1). Crop from the header 19 passes through an aperture 41 provided in stationary plate 37. As shown in FIG. 1, wheels 43 are mounted on the inside of stationary plate 37 for engaging the inner wall of feeder housing 35. Wheels 43 support the stationary plate 37 and are centered and adjusted by means of bolts that extend through slots 44 (FIG. 2).

Referring again to FIG. 1, a longitudinal axle 45 extends through and past the outer body 25. Axle 45 is carried in a bearing 47 on the forward end, which is mounted to stationary plate 37. The rearward end of axle 45 is supported in a frame member 49 that is secured to outer body 25 for rotation in unison. A multiple member drive linkage 51 extends from drive pulley 31 to the rearward end of axle 45 for rotating axle 45 in a direction that is opposite to the rotation of outer body 25. Linkage 51 is geared so as to provide axle 45 with a considerably higher speed of rotation than outer body 25, such as about 600 revolutions per minute. A conventional straw spreader 52 is secured to a vertical member of the drive linkage 51.

Referring to FIG. 1 and FIG. 6, threshing is handled by a threshing drum 53. A feeder head 54 is formed on the forward portion of drum 53. Feeder head 54 is frusto-conical with its smaller end on the forward end. Feeder head 54 contains impellers 55 for grabbing the crop in the feeder housing 35 and forcing it rearwardly. Helical flights 56 (FIG. 6) located on the inner wall of feeder housing 35 also urge the crop rearwardly. Threshing drum 53 is also frusto-conical, however, its large end is located forwardly of the rearward end and joins the feeder head 54. Threshing drum 53 converges to a smaller diameter rearwardly and has rasp bars 57 spaced on this converging sidewall surface for performing the threshing. Rasp bars 57 have protruberances and are inclined or spiraled into the direction of rotation to push the crop rearwardly.

The rasp bars 57 rotate in close proximity to a threshing grate 59. Grate 59 has a mating frusto-conical sidewall comprised of a plurality of bars extending 360 degrees around the grate, each spaced apart to define slots for threshed grain to fall through. Grate 59 thus converges to a smaller diameter in a rearward direction. Grate 59 is rigidly mounted to outer body 25 for rotation therewith. As a result, in the threshing space located between threshing drum 53 and grate 59, rasp bars 57 will be rotating in one direction while grate 59 rotates in the opposite direction. Openings 60 are provided in outer body 25 for grain to pass after threshing.

Grate 59 is also rigidly connected to an inner body 61 for rotation in unison. Inner body 61 is a cylindrical member having a concentric axis with outer body 25 but of a lesser diameter. This defines a cylindrical space between the inner body 61 and the outer body 25. Inner body 61 is perforated its entire length and circumference with slots 63. Slots 63 allow any grain that is separated in the inner body to pass through into the space between the inner body 61 and outer body 25. An outer flight 65 is rigidly connected between the inner and outer bodies and spiraled along their lengths. The direction of the spiraling of flight 65 is such that material falling into the spaces between the flights 65 will be moved forwardly as the inner body 61, outer body 25 and outer flight 65 rotate in unison. This causes any grain located in this space to be drawn to the forward end of the combine for further handling.

Figure 3:
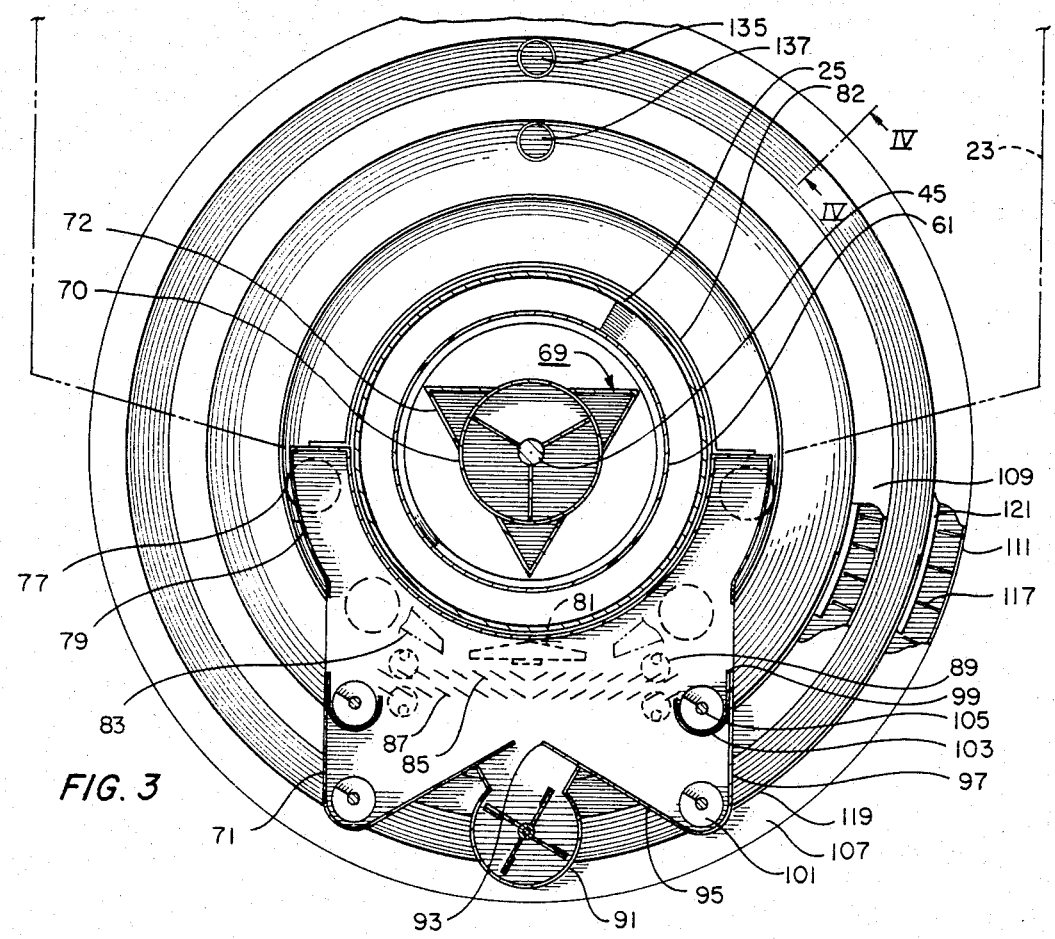
FIG. 3 is a sectional view of the combine of FIG. 1, taken along the line III—III of FIG. 1.

Crop debris from the threshing drum 53 is pushed into the inside of inner body 61. An inner flight 67 located on the inner wall of inner body 61 is spiraled opposite to outer flight 65 to push this crop material in a rearward direction, where it exits and is spread by the straw spreader 52. A beater 69 is rigidly mounted to the rearward end of threshing drum 53 for beating the crop material forced into the inner body 61 to remove any grain that may not have been threshed by the threshing drum 53. Beater 69 extends the length of inner body 61 and is triangular in cross-section as shown in FIGS. 3 and 6. The periphery of beater 69 is closely spaced to the inner flight 67.

Referring to FIGS. 1, 2 and 3, a sieve housing 71 is suspended below outer body 25. Sieve housing 71 is supported by forward or fore rollers 71 (FIGS. 1 and 2) that are carried in a guide track 75. Guide track 75 is a circular track that is mounted to the feeder housing 35 section of the outer body 25. Guide track 75 extends around the circumference of the feeder housing 35. Aft rollers 77 on the forward end are located in a guide track 79 that extends circumferentially around the outer body 25. Both guide tracks 75 and 79 rotate in unison with the outer body 25. The rollers 73 and 77, however, allow the sieve housing 71 to remain stationary. Rollers 73 and 77 also allow the sieve housing 71 to remain level or in the same transverse plane even though the frame 13 tilts transversely or sideways. The action of gravity will cause this leveling or pendulum effect.

A shock absorber 80, shown in FIG. 2, prevents too much swinging motion by providing dampening in a rotational direction. Shock absorber 80 is connected between a portion of frame 13 and sieve housing 71. Also shown in FIG. 2 is a cover 82 that extends from the top of each side of sieve housing 71. Cover 82 is an arcuate member that covers the openings 60 in outer body 25 provided to allow grain to fall from the grate 59 into the sieve housing 71. Cover 82 covers only the openings 60 when they are rotated onto the upper side.

Referring to FIGS. 1 and 3, the sieve means includes a spreader 81 located immediately below openings 60. Spreader 81 is located in a V-shaped trough 83 for distributing grain falling from grate 59 along the length of sieve housing 71. Spreader 81 is driven by a roller (not shown) that is frictionally driven through contact with guide track 75 (FIG. 1). A primary sieve 85 of a conventional nature is located immediately below spreader 81. Sieve 85 has rows of inclined, serrated chaffer fingers. Half of the rows of primary sieve 85 incline to the right, and the other half incline to the left. The inclination of the rows of fingers can be adjusted to vary the openings of the primary sieve 85.

A secondary sieve 87 of the same structure as primary sieve 85 is located below the primary sieve 85. Both sieves 85 and 87 are shaken or reciprocated by shaker means that includes eccentric wheels 89. These wheels 89 oscillate the sieves 85 and 87 in a slightly up and down and lateral direction. The lateral movement causes material on the sieves to tend to move to the right and left sides of the sieve housing 71. The eccentric wheels 89 are timed so as to shake the sieves 85 and 87 out of sequence with each other.

A blower 91 is mounted on the bottom of sieve housing 71. Blower 91 discharges air upwardly through a slot 93 that extends the length of sieve housing 71. This air discharges through the sieves 85 and 87, which deflect the stream of air outwardly in right and left directions. Clean grain that falls through the apertures in sieves 85 and 87 falls onto one of the two bottom sloping portions 95 of sieve housing 71. Each sloping portion 95 slopes opposite to the other laterally downward to a corner with a sidewall 97. Each sidewall 97 is a vertical wall with a window 99 on its upper section for allowing air from blower 91 to discharge. Chaff separated from the grain will also be blown out the windows 99. The clean grain will gravitate to one of the corners of a sloping portion 95 with a sidewall 97, where an auger 101 will transport the clean grain rearwardly for collection. The material which is too large to pass through the sieves 85 and 87, and too heavy to be blown from the primary sieve 85 will likely have grain firmly embedded within crop debris. This material, called tailings, is discharged into a channel 103 mounted to each sidewall 97 below window 99. A tailings auger 105 in channel 103 transports the trailings rearwardly for recycling.

A pair of elevating rings 107 and 109 are mounted in the same vertical lane and concentric with guide track 79. Elevating rings 107 and 109 and guide track 79 are all rigidly mounted to a plate or wall 113 (FIG. 4), which is rigidly mounted to outer body 25. The clean grain auger 101 is driven by frictional engagement with elevating ring 107, which is the larger diameter elevating ring. The clean grain auger 101 discharges clean grain into compartments formed in elevating ring 107. The trailings auger 105 similarly is driven by engagement with the lesser diameter elevating ring 109. The tailings are distributed into compartments formed in elevating ring 109.

Figure 4:
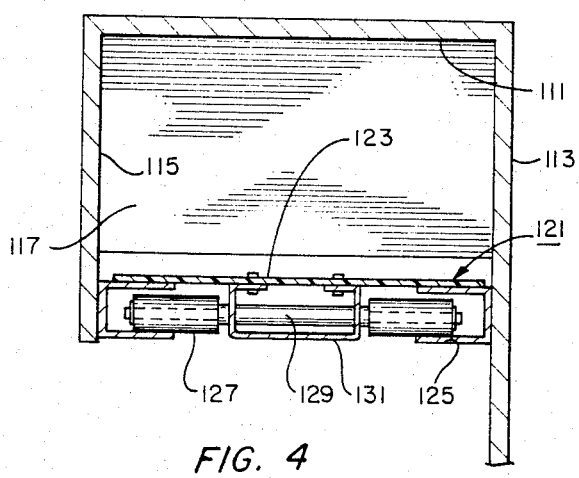
FIG. 4 is a sectional view of the combine of FIG. 1, taken along the line IV—IV of FIG. 3.
Figure 5:
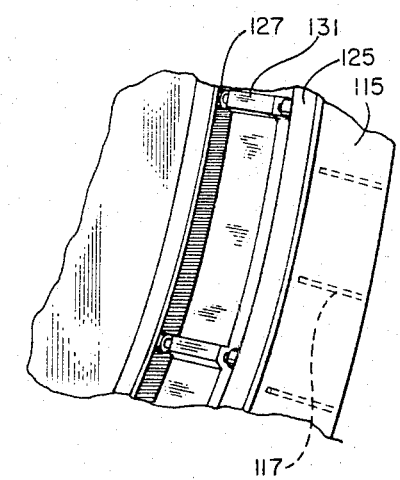
FIG. 5 is a partial perspective view looking inward into the clean grain elevating ring.

Referring to FIG. 4, each compartment consists of an outer diameter or outer wall 111, which is a cylinder concentric with the axle 45 (FIG. 1). Outer wall 111 extends between rearward wall 113 and a forward wall 115. Rearward wall 113 is a plate that extends from the outer body to the outer wall 111 of the outermost elevating ring 107. The forward wall 115 is parallel to the rearward wall 113, but is an annular plate that extends only the transverse width of an elevating ring 107 or 109. Radial partitions 117 are spaced along the elevating rings 107 and 109, each partition extending from the outer wall 111 and between the forward wall 115 and rearward wall 113.

The compartment means is completed by a lower cover plate 119 and an upper cover plate 121. Cover plates 119 and 121 are located on the right half of the elevating rings 107 and 109, when viewed as shown in FIG. 3, to prevent grain from falling out, the direction of rotation being counterclockwise. The compartments of the elevating rings 107 and 109 on the left half will be empty until reaching the left tailing auger 105 and clean grain auger 101, and thus do not need a cover plate. The lower cover plate 119 is rigidly secured to sieve housing 71 for movement therewith. The upper cover plate 121 is rigidly secured to bin 23. Since sieve housing 71 will swing or rotate with respect to bin 23 when combine 11 tilts sideways, the cover plates 119 and 121 telescope or overlap. Cover plates 119 and 121 thus do not rotate with the elevating rings 107 and 109.

Each cover plate, as shown in FIG. 4, has an elastomeric liner 123 that extends substantially the width of the outer wall 111. Liner 123 is located on the inner side of partitions 117 and in sliding engagement with a guide track 125. Rollers 127 rotate in the guide track 125, which has both inner and outer walls. Rollers 127 are spaced apart circumferentially and mounted on axles 129. Each axle extends through a bracket 131 that is secured to the elastomeric liner 123.

Referring to FIG. 2, the upper cover plates 121 terminate at a bin intake 133. Elevating ring 107 registers with an upper portion of bin intake 133 for discharging grain into an auger 135. Auger 135 conveys the grain into bin 23. The lower portion of bin intake 133 is vertically divided from the upper portion and comprises a tailings intake for receiving tailings from elevating ring 109. A tailings return auger 137 extends across bin 23 to a tailings return conduit 139. Conduit 139 delivers tailings back to the feeder housing 35 for rethreshing. A chain drive 141 is secured to one of the wheels 43 (FIG. 1) for driving tailings auger 137. A chain drive 143 extending from the rearward end of tailings auger 137 drives the clean grain auger 135.

Figure 7:
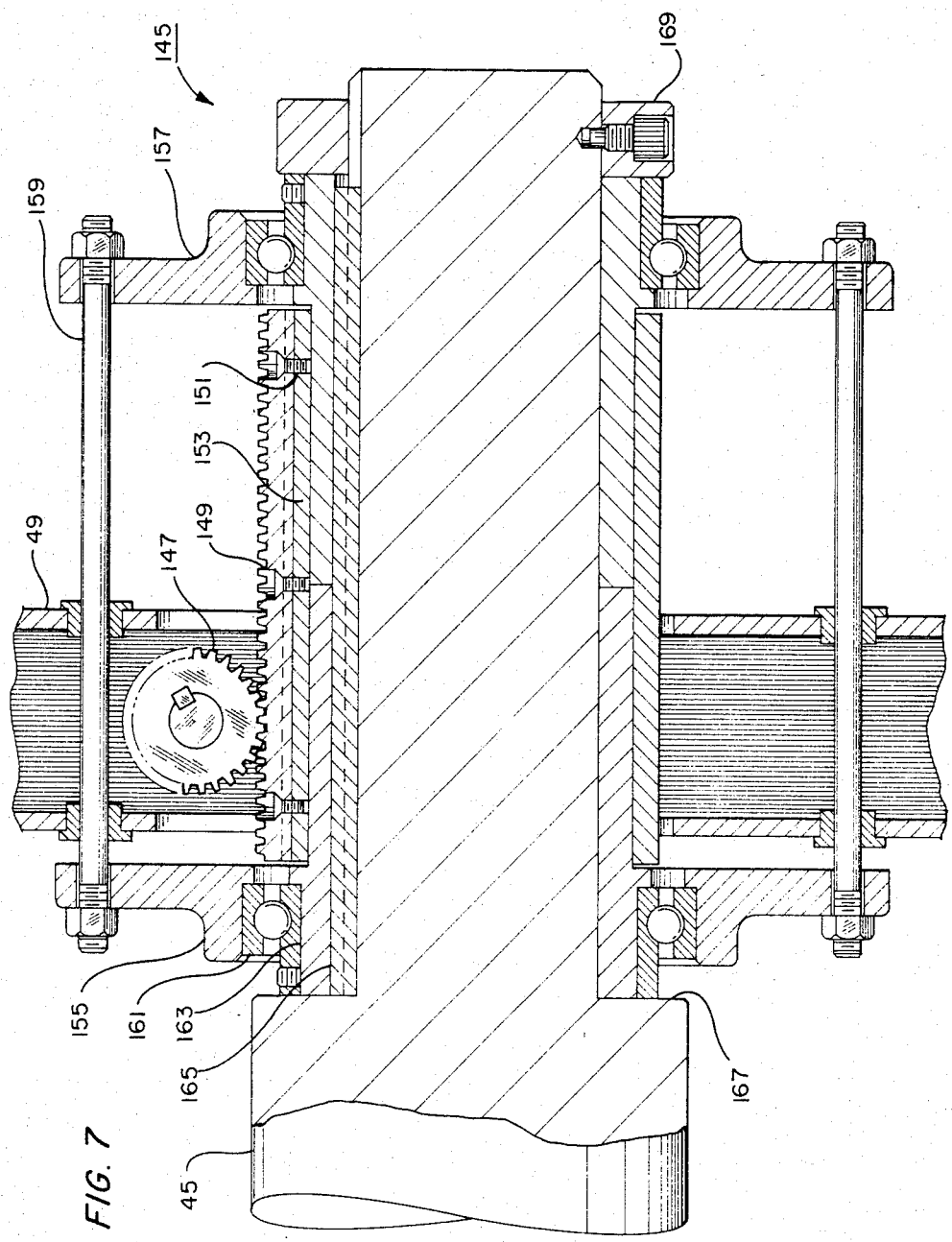
FIG. 7 is an enlarged sectional view of the rack and pinion assembly for adjusting the thresher drum of the combine of FIG. 1.

Referring to FIG. 1, the clearance between the threshing drum 53 and grate 59 can be varied by advancing axle 45 in a forward or rearward direction. This is handled by a rack and pinion assembly 145 mounted between frame member 49 and axle 45. One embodiment of the rack and pinion means 145 is shown in FIG. 7. This embodiment includes a pinion 147 rotatably mounted to frame member 49. The pinion 147 is a circular gear having teeth that engage teeth of a straight rack 149. Screws 151 connect rack 149 to a member 153. Member 153 is carried between two flanges 155 and 157. Upper and lower guide rods 159 extend between the flanges 155 and 157 and through holes formed in frame member 49. Each flange 155 and 157 receives a set of roller bearings 161. Each bearing 161 has a sleeve 163 located on its inner side that is keyed to axle 45 by means of a key 165. Axle 45 has a shoulder 167 that faces rearwardly and is located on the forward side of frame member 49. A collar 169 is bolted to the axle 45 on the rearward side of flange 157.

In the operation of the rack and pinion means of FIG. 7, rotating pinion 147 causes translational movement of rack 149, and along with it flanges 155 and 157. Flanges 155 will bear against shoulder 167 to move axle 45 forwardly if forward direction is desired to provide more threshing clearance. If rearward direction is desired, rotation of pinion 147 in the opposite direction will cause flange 157 to bear against collar 169 to move axle 45 in the rearward direction.

In the overall operation of combine 11, header 19 will cut the grain and transport it into the feeder housing 35. Impellers 55 will draw the grain inwardly into the threshing area between threshing drum 53 and grate 59. Much of the grain will be separated at this point and fall through the slots in grate 59 into the spreader 81 of the sieve means. The remaining portion of the crop will be forced into the inner body 61, which is rotated in a direction opposite to the rotation of the threshing drum 53. The beater 69 will beat the crop material, forcing any remaining grain out, to fall through the slots 63 in the inner body 61. The inner flight 67 will push the debris rearwardly to discharge and be spread by the spreader 52.

The rescued grain falls into an annular space between the inner body 61 and outer body 25. The outer flight 65 moves the rescued grain forwardly due to the rotation of the inner and outer bodies together. This rescued grain, along with initially threshed grain falls onto the spreader 81, which spreads the grain over the primary sieve 85. Clean grain falls through the primary sieve 85 and secondary sieve 87 to the bottom of the sieve housing 71. Chaff is blown laterally outwardly through windows 99 by the blower 91. Tailings are distributed into a tailings channel 105 (FIG. 3 for rethreshing. Clean grain is delivered to the rear of the sieve housing by auger 101 (FIG. 3) for transmission to the storage bin 23.

The outer elevating ring 107 receives the clean grain from the clean grain auger 101 and delivers it upwardly to storage bin 23. The inner elevating ring 109 receives tailings from the auger 105 and delivers it up to an auger 137. Auger 137 delivers the tailings to conduit 139 for conveying back, to the feeder housing 35.

The invention has significant advantages. The pendulum mounting of the sieve housing allows it to remain level in a transverse direction even though the frame of the combine tilts sideways. This allows one to maintain a high speed of cutting when tilted, without risking loss of grain being blown out along with chaff. The elevating rings allow the pickup of material from the sieve and delivery for storage or recycling regardless of the location of the sieve with respect to the frame. The 360 degree, rearwardly converging threshing gate and the counter rotation of the grate with the threshing drum, causing threshing in a shorter distance, with less pressure and with less power requirements than conventionally. Rotation of the various members through rollers, which can be elastomeric, reduces vibration over previous machines which used an extensive amount of belts and chains.

While the invention has been shown in only one of its forms, it should be apparent to those skilled in the art that it is not so limited but is susceptible to various changes without departing from the spirit of the invention.

I claim:

1. In a combine having a frame mounted on wheels, an improved means for threshing and separating grain from crop, comprising:
   an outer body mounted on the frame;
   an inner body mounted inside the outer body for rotation with respect to the frame, the inner body containing a plurality of slots;
   an outer helical flight located between the inner and outer bodies and spiraled for causing grain that has fallen through the slots to move forwardly as the inner body rotates;
   a hollow grate mounted at the forward end of the inner body for rotation therewith and having a sidewall containing a plurality of apertures for threshed grain to pass, the grate being frusto-conical with a circular entrance for receiving crop and having a circular exit spaced rearwardly for discharging crop, the entrance of the grate being of larger diameter than the exit;
   a threshing drum mounted inside the grate, the threshing drum having a frusto-conical sidewall with a larger forward end than a rearward end;
   a beater rigidly mounted to the threshing drum and extending rearwardly through the inner body, the threshing drum and beater being driven in a direction opposite to the direction of rotation of the inner body; and
   inner flight means mounted inside the inner body for causing crop to move rearwardly for discharge as the inner body rotates.

2. In a combine having a frame mounted on wheels, threshing means carried by the frame for receiving crop and threshing grain from the crop, comprising in combination:
   a hollow grate having a circular entrance for receiving crop and a circular exit spaced longitudinally rearward for discharging crop, the entrance of the grate being of larger diameter than the exit, the grate having a converging sidewall containing a plurality of apertures for threshed grain to pass through; and
   a rotatably driven threshing drum mounted inside the grate, the drum having a converging sidewall with a larger forward end than a rearward end, defining a threshing space between the sidewalls of the drum and grate.

3. The combine according to claim 2 wherein the drum and the grate are rotated in opposite directions to each other.

4. The combine according to claim 2 wherein the sidewalls of the drum and the grate are frusto-conical.

5. The combine according to claim 2 wherein the sidewalls of the grate comprise longitudinally extending spaced apart bars extending 360° around the grate, with the apertures being spaces between the bars.

* * * * *